(12) United States Patent
Mantell (10) Patent No.: US 7,869,095 B2
(45) Date of Patent: Jan. 11, 2011

(54) SYSTEM AND METHOD TO PERTURB ERROR DIFFUSION PATTERNS

(75) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 625 days.

(21) Appl. No.: 11/933,587

(22) Filed: Nov. 1, 2007

(65) Prior Publication Data

US 2009/0116071 A1 May 7, 2009

(51) Int. Cl.
H04N 1/405 (2006.01)
(52) U.S. Cl. ............ 358/3.22; 358/3.14; 358/3.03
(58) Field of Classification Search .......... 358/1.9, 358/2.1, 3.03–3.06, 3.13–3.14, 3.16, 3.19, 358/3.22
See application file for complete search history.

(56) References Cited

U.S. PATENT DOCUMENTS

| | | | |
|---|---|---|---|
| 5,467,201 A | 11/1995 | Fan | |
| 5,809,177 A | 9/1998 | Metcalfe et al. | |
| 5,880,857 A | 3/1999 | Shiau et al. | |
| 6,369,912 B1 * | 4/2002 | Kumashiro | 358/1.9 |
| 6,449,061 B2 | 9/2002 | Metcalfe | |
| 6,563,957 B1 * | 5/2003 | Li et al. | 382/252 |
| 6,671,068 B1 | 12/2003 | Chang et al. | |
| 7,520,583 B2 * | 4/2009 | Arazaki et al. | 347/15 |
| 2008/0205765 A1 * | 8/2008 | Fan et al. | 382/191 |

OTHER PUBLICATIONS

Damera-Venkata, N.; Adaptive threshold modulation for error diffusion halftoning; IEEE Transactions on Image Processing, vol. 10 No. 1, Jan. 2001.
Chang, T.; Memory efficient error diffusion; IEEE Transactions on Image Processing, vol. 12, 11, Nov. 2003.
Ulichney. R.; Digital Halftoning; Roetling, Paul G. Publication:, Applied Optics IP, vol. 27, Issue 6, p. 1029. Publication Date:, Mar. 1988.

* cited by examiner

Primary Examiner—Thomas D Lee
Assistant Examiner—Stephen M Brinich
(74) Attorney, Agent, or Firm—Michael J. Nickerson; Basch & Nickerson LLP (57) ABSTRACT

A method for halftoning an image using an error diffusion process generates an upper threshold level and a lower threshold level and selects a region number parameter. A pixel from the input image is selected and compared to the upper and lower threshold levels. A first pixel value is output when the input pixel value is below the lower threshold level. The first pixel value is output when the input pixel value is below the upper threshold level and above the lower threshold level and a value of the input pixel divided by the region number parameter, modulo 2, equals zero. A second pixel value, the first pixel value being different from the second pixel value, is output when the input pixel value is below the upper threshold level and above the lower threshold level and a value of the input pixel divided by the region number parameter, modulo 2, is greater than zero. The second pixel value is output when the input pixel value is above the upper threshold level. The error between the output pixel value and the modified input pixel value is diffused to neighboring pixels.

19 Claims, 12 Drawing Sheets

SYSTEM AND METHOD TO PERTURB ERROR DIFFUSION PATTERNS

BACKGROUND AND SUMMARY

There are many methods of rendering grey images on an output device. One such example is error diffusion. Error diffusion can render complex images that contain a mixture of text and picture reasonably well. The utilization of error diffusion eliminates the need to have image segmentation to separate the text from the picture so that the picture aspect of the document can be screened and the text aspect of the document can be threshold.

In a typical error diffusion binarization circuit, a modified video signal is fed to a comparator which compares the modified video signal to a threshold value. The comparator outputs a logic one when the modified video signal has a value greater than or equal to the threshold value and outputs a logic zero when the modified video signal has a value less than the threshold value. Depending on whether the rendering device connected to this error diffusion binarization circuit is a write white system or a write black system, the logic value of the output from the comparator will cause the rendering device to produce a pixel or not.

In addition to producing the binary value for the rendering device, the comparator produces an error value. The error value is the modified video signal value when the modified video signal has a value less than the threshold value, or the error value is equal to the modified video signal value minus the maximum video value when the modified video signal has a value greater than or equal to the threshold value. The error is diffused to downstream pixels, the next pixel in the same scanline and pixels in the next scanline. This error is then accumulated for each pixel such that when a particular pixel is to be processed by the error diffusion binarization circuit, the accumulated error value for the particular pixel is added to the incoming video signal corresponding to the particular pixel to produce the modified video signal being fed into comparator.

One problem associated with the utilization of error diffusion in rendering an image on a document is the occurrence of periodically repeating patterns. These patterns occur most notably at the grey levels of 85, 128, and 170 when an 8-bit data word is utilized to represent the grey level of the image data. For example, when the grey level input is 128, the binarized image can alternate between a checkerboard pattern and a vertical line pattern. Depending on the printer spot size and the grey level at which the spot was mapped, the vertical line pattern can appear lighter than the checkered board pattern, thereby producing a undesired artifact.

The idea of dithering or adding threshold perturbations to defeat visual artifacts of a regular and deterministic nature has been utilized in the prior art. For example, in the article "Digital Halftoning" by Robert Ulichney, it was proposed to add random noise, across the entire image, to the elements of the error weights or to the threshold to defeat the visual artifacts discussed above However, by adding noise to all parts of an image tends to degrade the image and will also destroy the dot pattern established in the highlight and shadow areas.

Conventionally, error diffusion systems perturbed a threshold relationship between a modified video image signal and a threshold signal by adding random noise to an error diffusion modified video or image signal in an error diffusion binarization system. In such systems, a random noise generator produces a random noise signal which is added to the error diffusion modified image signal. The random noise produced by the noise generator is a function of the grey level of the image to be threshold.

More specifically, if the grey level to be threshold represents either 128, 85, or 64, when utilizing an 8-bit data word to represent a grey level of the image data, the random noise generator will produce some random noise level which will be added to the image or video signal. The modified video or image signal is then binarized by a comparator circuit. The comparator circuit compares the modified video or image signal with a threshold value. If the modified video or image signal is greater than or equal to the threshold value, the comparator outputs a logical value indicating that the pixel is ON or if the modified video or image signal is less than the threshold value, the comparator circuit outputs a logical value representing that the pixel is OFF. An error is generated from this binarization process wherein this error is diffused to adjacent pixels utilizing any conventional error diffusion process.

This conventional noise perturbation process requires additional hardware or processing to generate the noise.

Alternatively, conventional error diffusion systems have also perturbed a threshold relationship between a modified video image signal and a threshold signal by using deterministic bit-flipping. In this conventional system, the thresholding process includes not only a minimum below which no dot is printed, but also a region above the threshold for which no dot is printed. The extra region is adjusted based on input level in order provide an appropriate amount of effect to break up the undesirable limit cycles.

This conventional bit-flipping perturbation process does not completely break-up the alternating patterns in the regions.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 1:
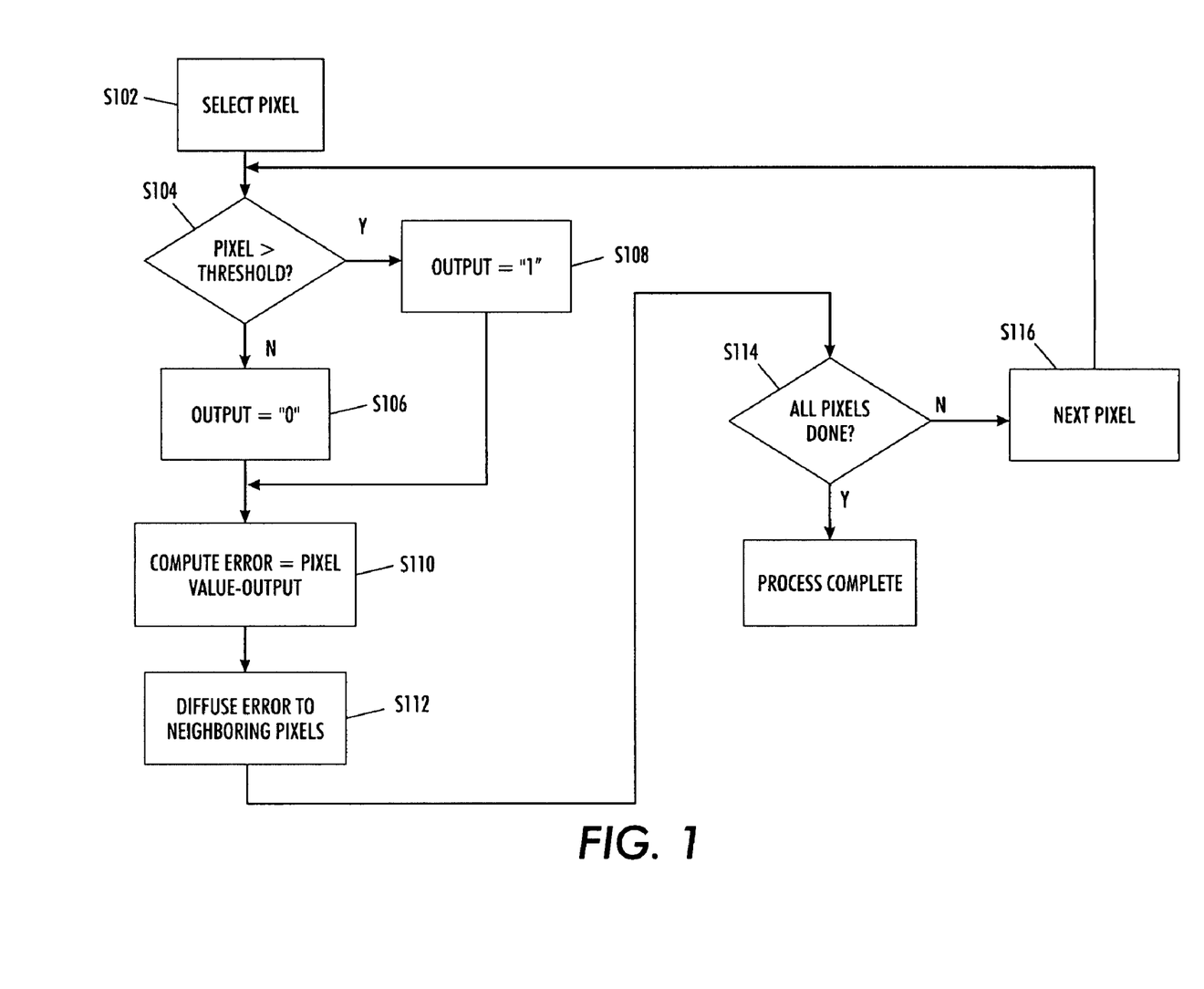
FIG. 1 illustrates a flowchart showing the conventional way of halftoning an image using an error diffusion process.

FIG. 1 illustrates a flowchart for a conventional error diffusion halftoning process. At step S102, a pixel from the input multilevel image is selected. At step S104, the pixel is compared to a threshold value, typically 127 in a system where the input image values range from 0 to 255.

If the input pixel value is above the threshold, the corresponding pixel of the output binary image is set to "1" or other value representing that the pixel is to be "ON," at step S108; otherwise, the output binary image is set to "0" or other value representing that the pixel is to be "OFF," at step S106. At step S110, the difference between the output value and the input value is computed, and at step S112, the error divided among neighboring pixels with possibly different weightings for each neighboring pixel. For the neighboring pixels a modified input is created from the addition of errors from previously processed pixels. Different schemes for choosing which neighboring pixels and the weights are well known to those skilled in the art and will not be described here. At step S114, a check is made to determine if all pixels have been processed; if all pixels have not been processed, the next pixel is selected, at step S116, and processing returns to step S104.

Figure 2:
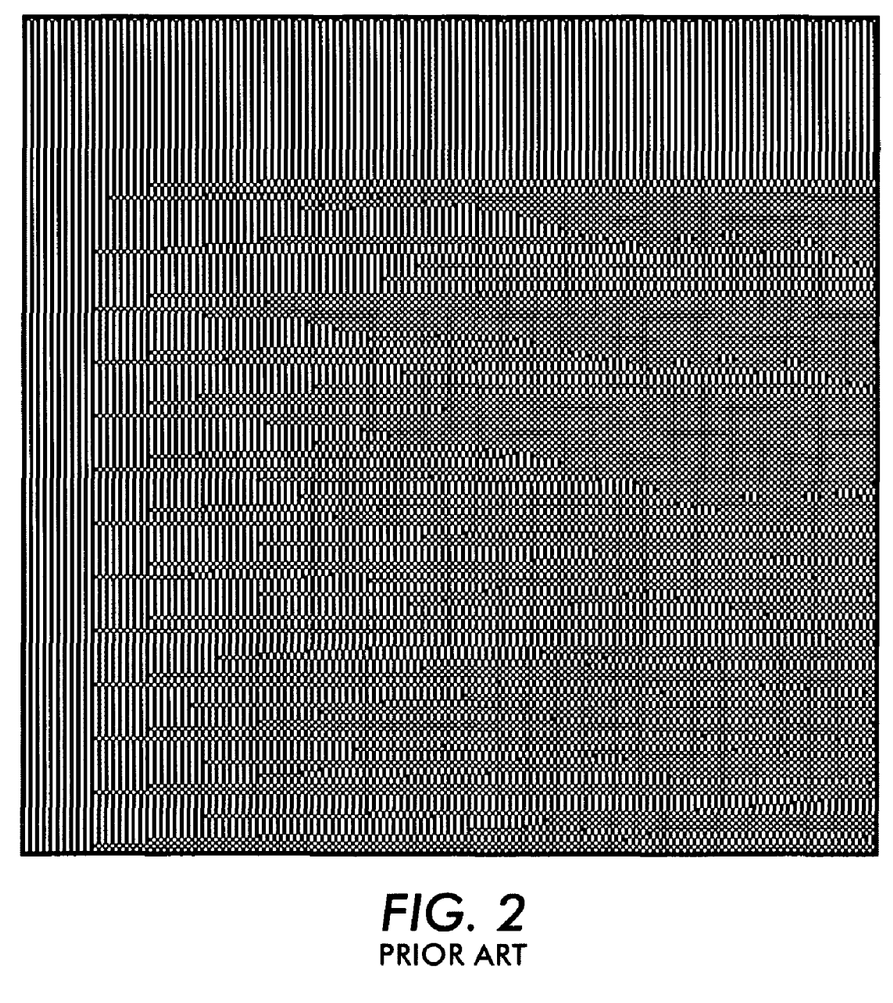
FIG. 2 illustrates the output of a conventional error diffusion of an image with uniform input value, showing the generation of undesirable artifacts.

The error diffusion process of FIG. 1 can give rise to artifacts in the output image, with certain ranges of the input pixel values being more likely to generate these artifacts. FIG. 2 shows the output from such a process for an input image with a constant gray value of 128. It is apparent from FIG. 2 that there are large regions where a somewhat regular pattern emerges, which reduces the effectiveness of the halftoning process in rendering a high quality binary image.

Figure 3:
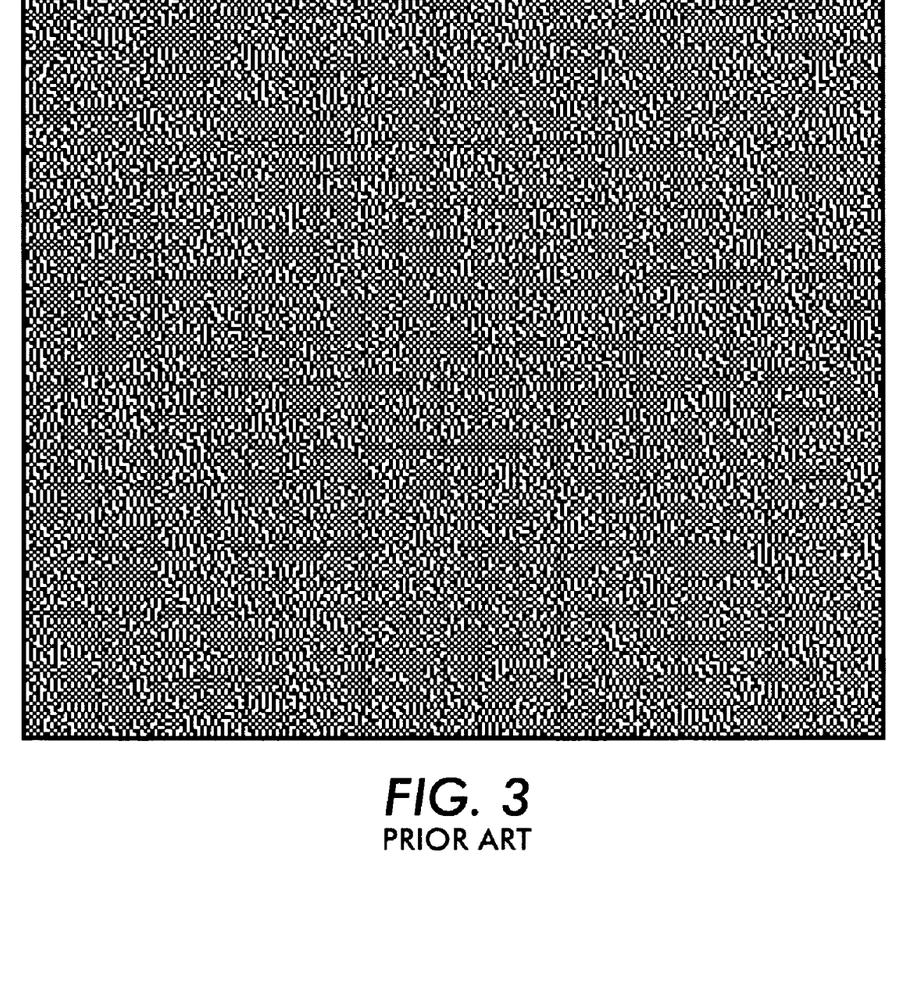
FIG. 3 illustrates the output of a conventional error diffusion process which perturbs a threshold relationship between a modified video image signal and a threshold signal by adding random noise.

As noted above, a conventional approach to reduce the artifacts generated in a standard error diffusion process is to inject a small amount of noise to perturb the relationship of the threshold and the image video. The injected noise will tend to average out, thus not seriously modifying the resulting output appearance. However, the noise will also cause an effective random shift in the threshold, thus tending to break up and patterns that would otherwise develop. FIG. 3 shows the output from a conventional noise addition system. The artifacts are reduced, but are still noticeable. Adding a large amount of noise can break up these artifacts but this can result in a much noisier output image.

Figure 4:
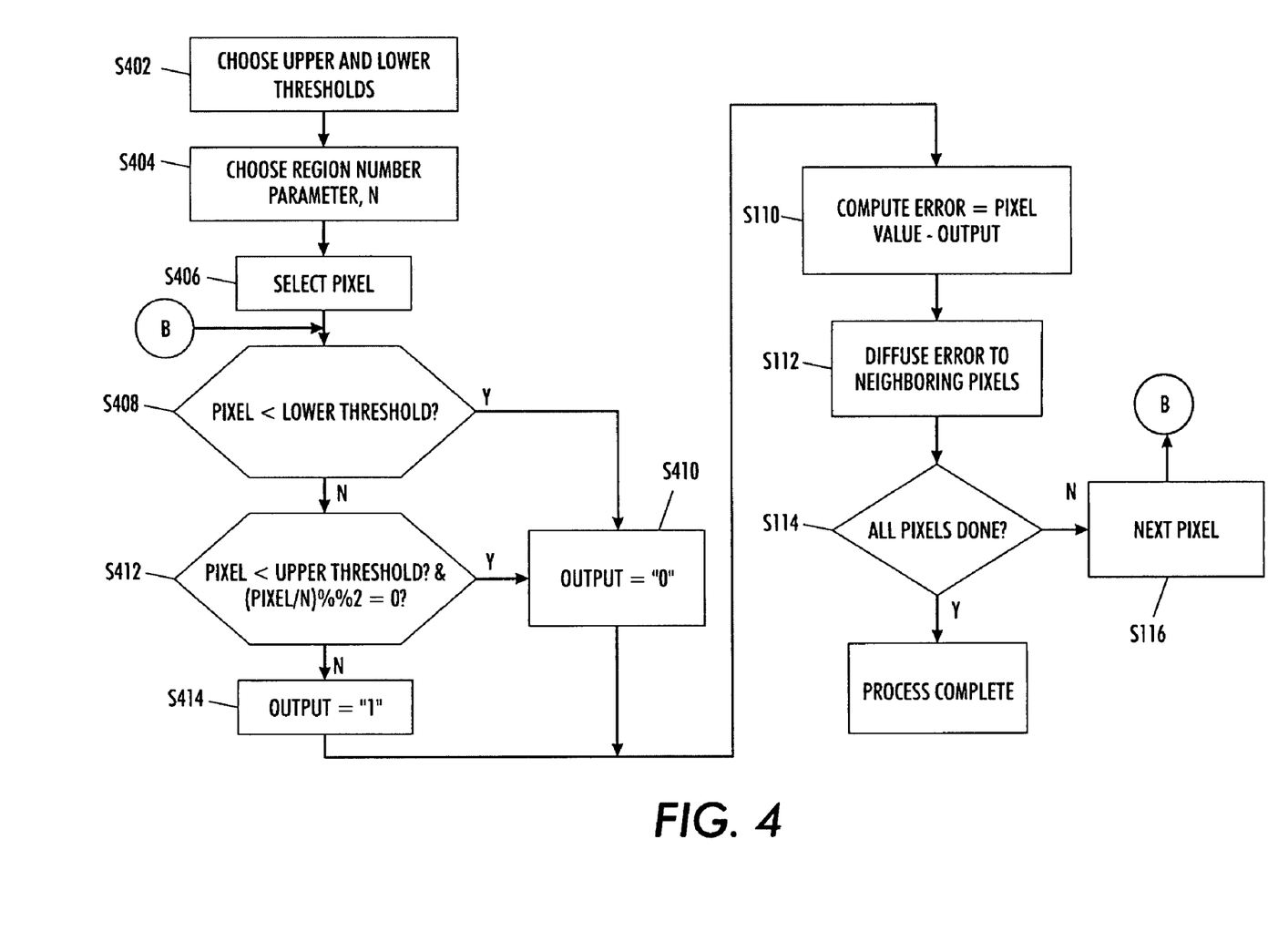
FIG. 4 illustrates a flowchart for a modified error diffusion process using a bit-flipping perturbation process.
Figure 5:
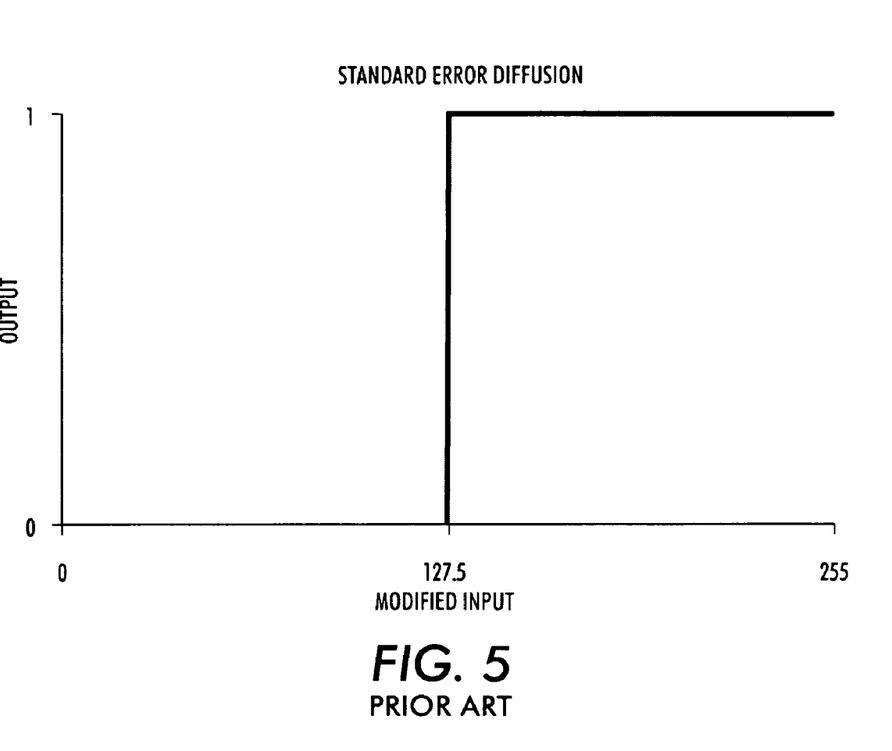
FIG. 5 graphically illustrates a conventional error diffusion process.
Figure 6:
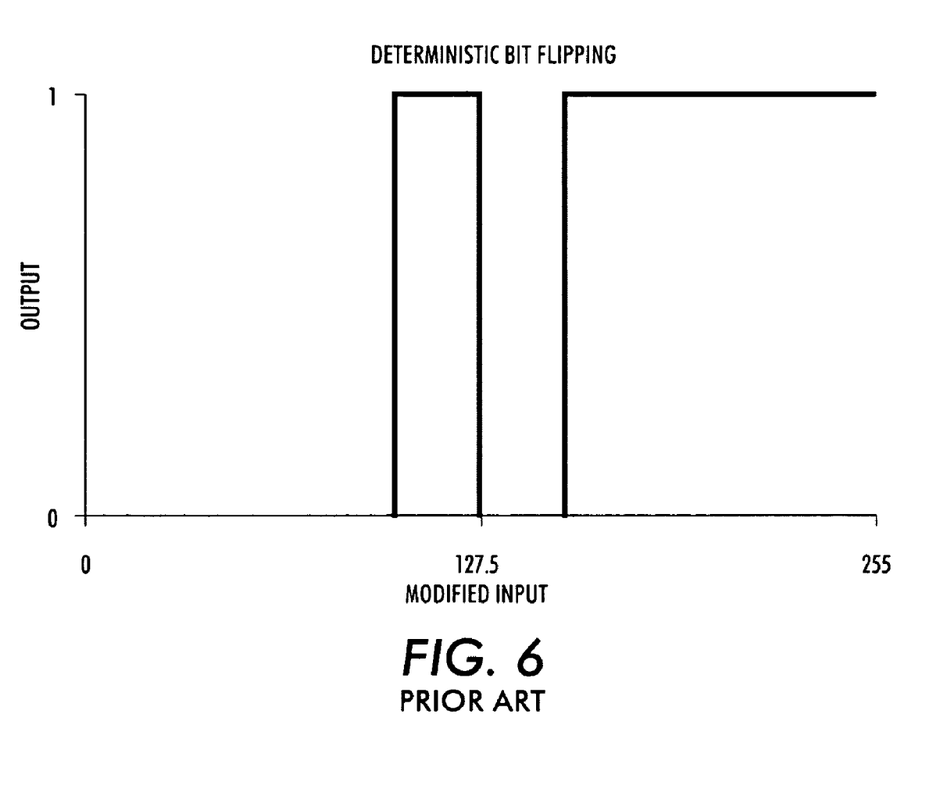
FIG. 6 graphically illustrates a conventional error diffusion process using a bit-flipping perturbation process.

FIG. 4 shows a flowchart for a modified error diffusion halftoning process that substantially eliminates the artifacts that arise from the standard process. At step S402, an upper and a lower threshold value are selected for each possible input value. At step S404, a region number parameter, N, is selected. The region number parameter determines how many alternating sub-regions are between the lower and upper thresholds. For example, as illustrated in FIG. 5, a standard error diffusion process has a region number equal to zero. Moreover, in a conventional deterministic bit-flipping error diffusion process, as illustrated in FIG. 6, the region number equals two. Typically, the same regional number is sufficient for all input values.

The actual halftoning process begins, at step S406, by selecting the first pixel in the image. At step S408, a comparison is made between the input pixel and the lower threshold; if the input pixel is below the lower threshold, the output binary image is set to "0" or other value representing that the pixel is to be "OFF," at step S410. If the pixel comparison, at step S408, is not below the lower threshold, a second check is made at step S412. In this check, at step S412, if the input pixel is below the upper threshold, and if further, the pixel value divided by the region number parameter modulo two (a modulo operation finds the remainder of a division of one number by another) is zero, the output binary image is set to "0" or other value representing that the pixel is to be "OFF," at step S410. Otherwise the output binary image is set to "1" or other value representing that the pixel is to be "ON," at step S414. The rest of the method follows the same process as in the standard error diffusion process illustrated in FIG. 1, herein illustrated as steps S110 through S116.

The effect of the modified thresholding process at steps S402 through S414 in FIG. 4 is to break up or perturb the region of input pixel into a series of alternating narrow regions where the thresholding results in a rapid alternation (with input pixel value) of "0" (or other value representing that the pixel is to be "OFF") and "1" (or other value representing that the pixel is to be "ON") outputs.

Since the error introduced by this alternating threshold cancels out over finite sized regions of the image, there is little or no visible change in the overall output image. However, the changing threshold causes the tendency of the diffused error to build up in semi-periodic ways to be cancelled, thus removing the generation of the artifacts that result from conventional error diffusion processes.

As noted above, the region number parameter determines how many of these alternating sub-regions there are between the lower and upper thresholds. Conventionally, the threshold behavior is modified by dividing the region of input image values between the lower and upper thresholds into just two regions, as illustrated in FIG. 6. However, artifact suppression can be improves by increasing the number of sub-regions, as illustrated in FIG. 7, thus improving the uniformity of the image.

FIG. 5 illustrates the output vs. the input of conventional error diffusion wherein the input image value includes any error diffused. As illustrated in FIG. 5, for input values below the threshold, the output is "0" or other value representing that the pixel is to be "OFF," while for values above the threshold, the output is "1" or other value representing that the pixel is to be "ON."

FIG. 6 illustrates the output vs. the input of conventional bit-flipping error diffusion wherein the input image value includes any error diffused. As illustrated in FIG. 6, there is a region just below the threshold where the output is "1" or other value representing that the pixel is to be "ON," not "0" or other value representing that the pixel is to be "OFF." Also, there is a similar region immediately above threshold where the output is "0" or other value representing that the pixel is to be "OFF," instead of "1" or other value representing that the pixel is to be "ON."

Figure 7:
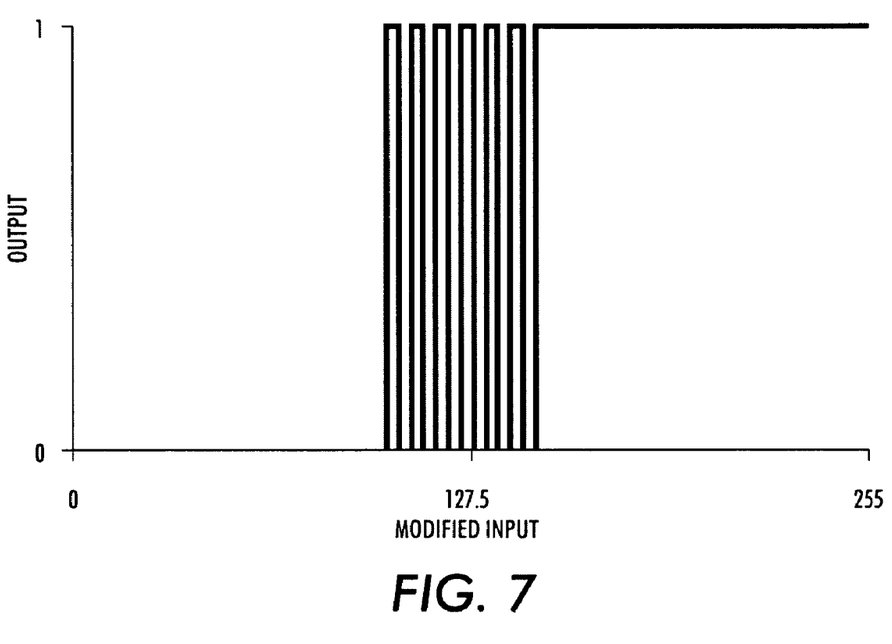
FIG. 7 graphically illustrates an error diffusion process using a bit-flipping perturbation process.

FIG. 7 illustrates the output vs. the input of region number based bit-flipping error diffusion wherein the input image value includes any error diffused. As illustrated in FIG. 7, there is a region between the lower and upper thresholds that is divided into a series of alternating regions as is expected for a modulus 2 operation. In alternating regions the output is "0" or other value representing that the pixel is to be "OFF," or "1" or other value representing that the pixel is to be "ON."

Figure 8:
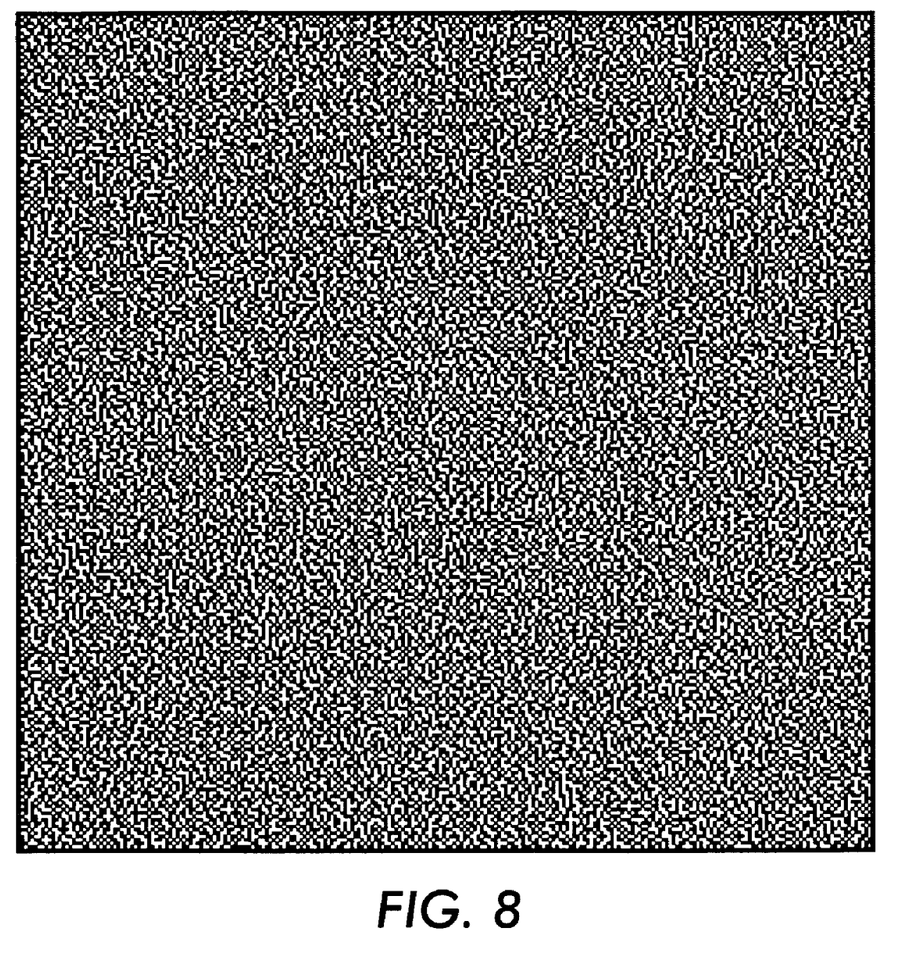
FIG. 8 illustrates the output of an error diffusion process using a bit-flipping perturbation process.

FIG. 8 illustrates the results from utilizing the error diffusion process illustrated in FIG. 4 upon the same input image that generated the results illustrated in FIGS. 2 and 3. The artifacts of FIG. 8 are reduced by a significant amount and are much less noticeable.

Figure 9:
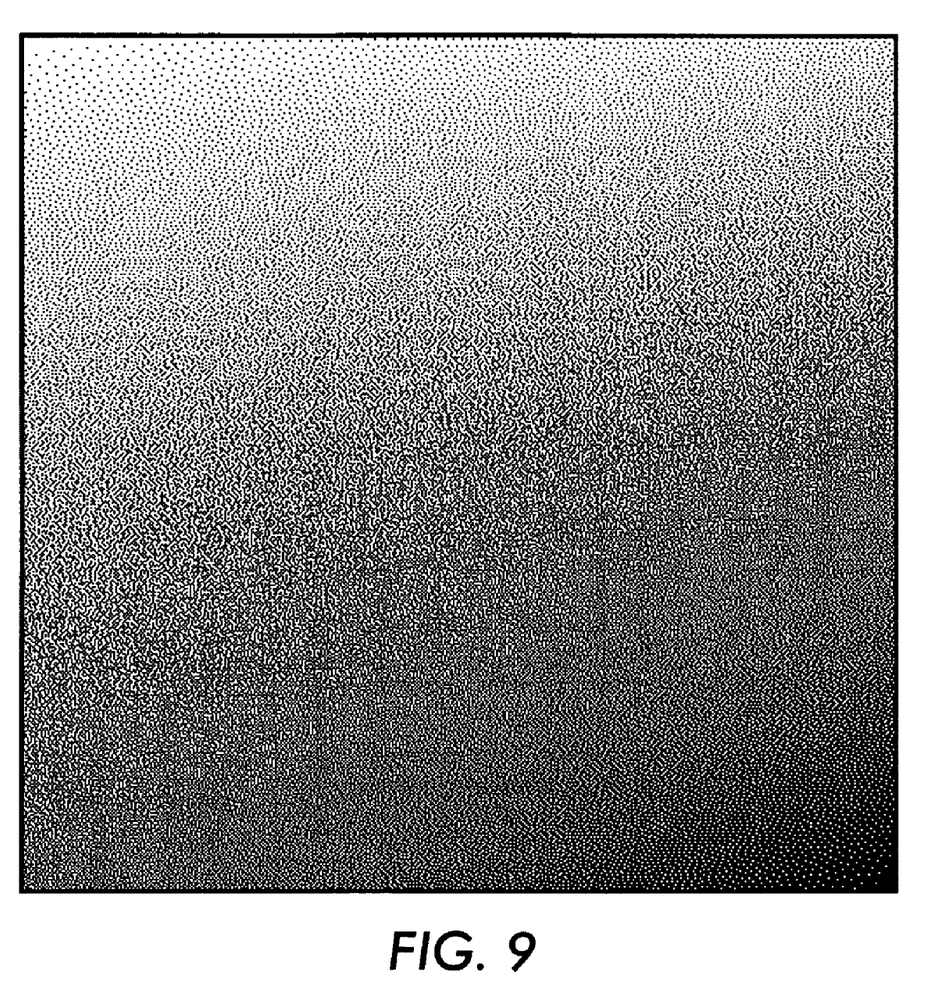
FIG. 9 illustrates the output of an error diffusion process using a bit-flipping perturbation process.

FIG. 9 illustrates the result of applying the process illustrated in FIG. 4 to an image which consists of a sweep, a sweep is an image whose pixel values vary from 255 (white) at the upper left corner to 0 (black) at the lower right corner. Such sweeps are often used to test a halftoning process to see how smooth the output binary image appears. The image illustrated in FIG. 9 shows a smooth sweep with little or no visible artifacts or contouring.

A simplification of the process illustrated in FIG. 4 can be realized by the region number parameter an integral power of 2. If the process illustrated in FIG. 4 is simplified such that the region number parameter is an integral power of 2, the divide and modulo operation can be carried out by examining the state of a single bit of the modified input pixel value. For example, if the value of the divide modulo 2 is 1, the bit corresponding to that bit in the input pixel byte will also be 1.

It is noted that the process illustrated in FIG. 4 can be modified such that the threshold is varied in a way that depends on the unmodified input pixel value. In this embodiment, the lower threshold is modified by subtracting a value, $\Delta$ (delta), from the standard threshold value and adding the same amount, $\Delta$ (delta), to the standard threshold value to get the upper threshold. It should be appreciated that it is not necessary for the upper and lower thresholds to be equally spaced around the standard threshold value. For example the lower threshold could always be the standard threshold and the upper threshold could be equal to that plus some $\Delta$ (delta). Error diffusion is robust enough to tolerate significant variations in threshold without difficulty.

Figure 10:
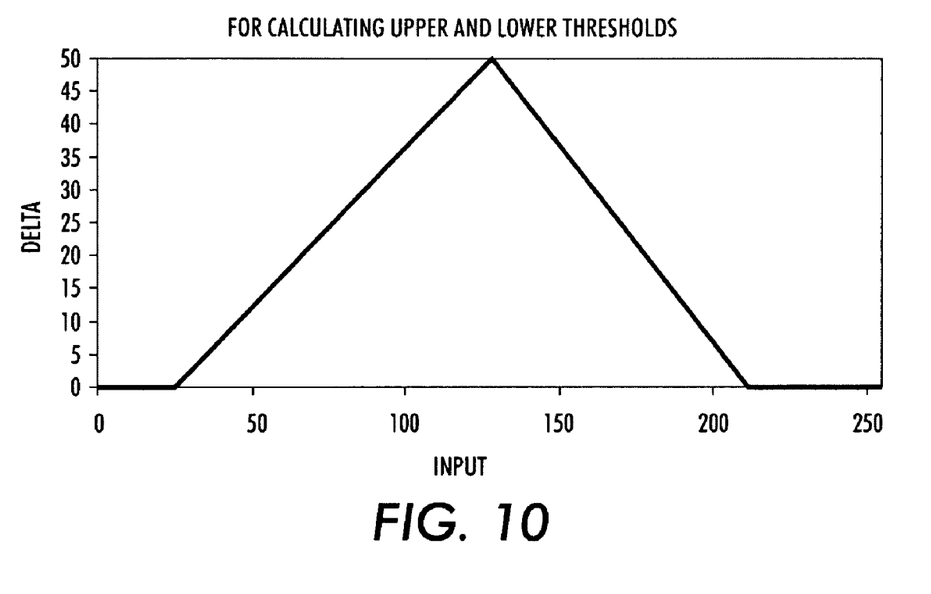
FIG. 10 graphically illustrates upper and lower thresholds for an error diffusion process using a bit-flipping perturbation process.

An example, of the relationship between the input pixel value and $\Delta$ (delta) is illustrated in FIG. 10. As illustrated in FIG. 10, the value of $\Delta$ (delta) is linearly dependent on the distance the input pixel is above or below the standard threshold (in this illustrated example 127). As the unmodified input pixel value comes closer to the standard threshold value, the value of $\Delta$ (delta) is increased. The selecting of the upper and lower thresholds using the method illustrated in FIG. 10 can be readily implemented in hardware, e.g. an ASIC, so that the upper and lower thresholds can be calculated on the fly rather than being pre-calculated and stored in a lookup table. More complicated functions are possible and can be tailored to be larger in regions that are more likely to create repeating artifacts. These regions are anywhere near input values that are integral fractions of the total input range (e.g. ½, ⅓, ¼, ⅔, ¾, and so on). For example, one might use a piecewise linear function that locally peaks at each of these input values. With more complicated functions, it may be advantageous to store the values in a lookup table.

The magnitude of the delta functions needed to break up artifacts not only depends on the input levels but also depends on the content of the image. Images that are computer generated often have little or no noise characteristics and can be devoid of any significant local texture while those that are captured from video or from scanning an original document will have an appreciable amount of inherent noise. The former require significantly larger values of delta to break up texture artifacts. It can be advantageous to vary the delta values based on the input source of objects within an image. In some cases one does not know the source, but the nature of the texturing can be determined to a sufficient level. Thus, it is possible to enable adjustment of the $\Delta$ (delta) values in the algorithm accordingly.

Figure 11:
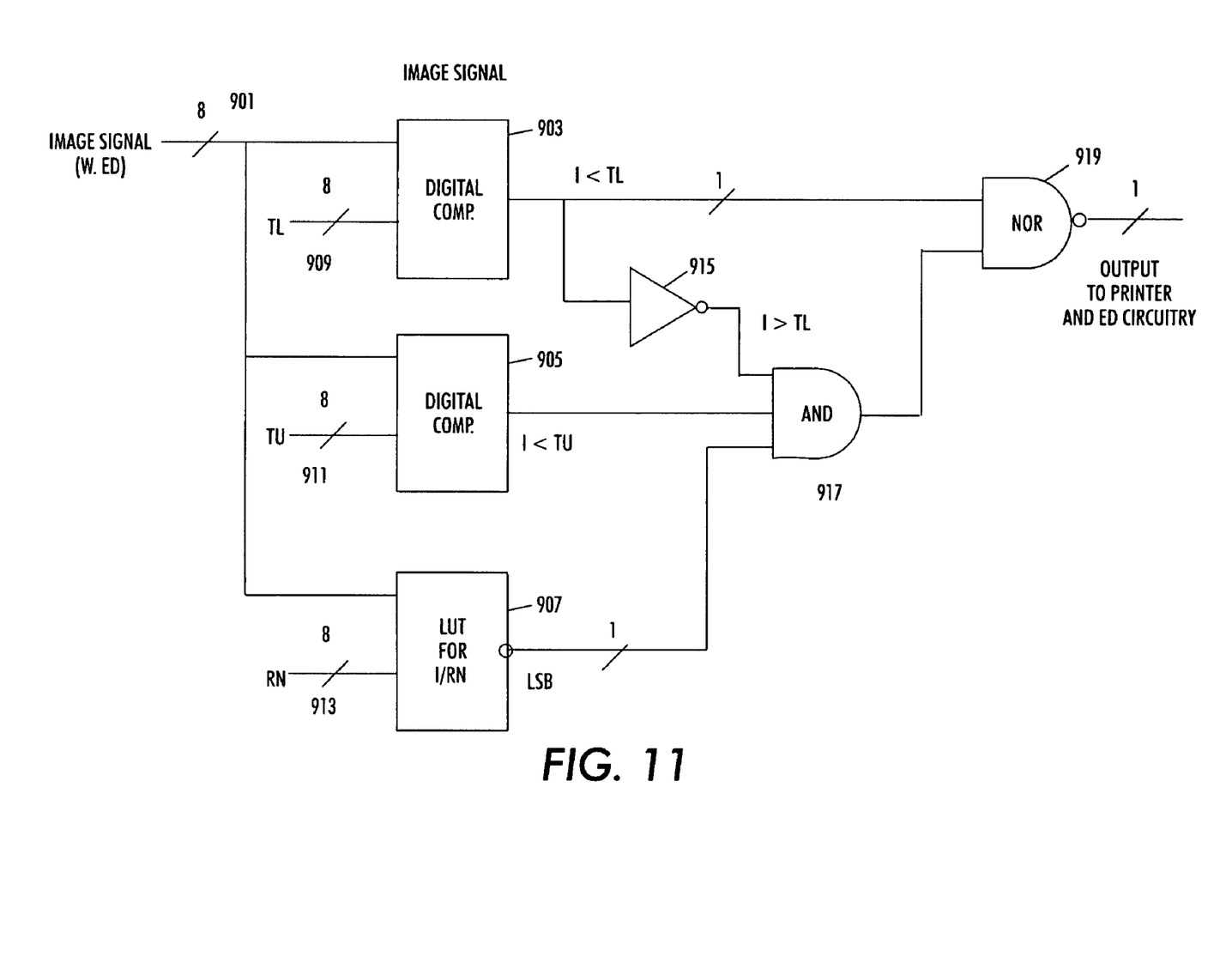
FIG. 11 illustrates a circuit for an error diffusion process using a bit-flipping perturbation process.

As previously noted, the process described above is readily implemented in hardware. FIG. 11 provides an illustrated example of a logical block diagram of a hardware implementation for the process of FIG. 4. It is noted that the decision as to which of the two possible binary values can be reduced to a single logical equation:

$$BinOut=NOT[[Ip<TL]+[I<TU]*[I>TL]*[(I/N)\%\%2==0]]$$

Where:
BinOut is the binary pixel value output;
Ip is the input pixel value including any diffused error;
TL and TU are the lower and upper threshold values;
N is the region number parameter;
% % denotes the modulus operation; and
== denotes the equality comparison.

FIG. 11 illustrates a circuit to implement BinOut=NOT [[Ip<TL]+[I<TU]*[I>TL]*[(I/N) % % 2==0]]. In FIG. 11, the input pixel (Ip) value 901, which includes any error from previous halftoning decisions added to it, is compared to the lower threshold (TL) value 909 by digital comparator 903. The output of digital comparator 903 is a logical "1" when the input pixel (Ip) value 901 is below the lower threshold (TL) value 909.

Simultaneously, the input pixel (Ip) value 901 is also compared to the upper threshold (TU) value 911 by digital comparator 905. The output of digital comparator 905 is a logical 1 if the input pixel (Ip) value 901 is below the upper threshold (TU) value 911.

A third circuit element 907 performs the division of the input pixel (Ip) value 901 by the region number (RN) parameter 913. The third circuit element 907 can be implemented in a number of ways, for example, as a simple LUT with a single bit output where the single bit is the inverse of the lowest order bit of the quotient resulting from the division of the input pixel (Ip) value 901 by the region number (RN) parameter 913.

The output of third circuit element 907, digital comparator 907, and the output of digital comparator 903, which is inverted by gate 915, are logically combined by AND gate 917. The output of AND gate 917 is logically combined, by NOR gate 919, with the output of digital comparator 903. The output of NOR gate 919 is a binary 0 or 1 as defined by above equation.

Not shown in FIG. 11 is the circuitry to compute the error, which is the difference between the output value and the actual input pixel value, together with the elements needed to compute the weighted distribution of the error to succeeding pixels. Such circuitry is well known to those skilled in the art.

If the region number parameter is chosen to be an integral power of two, the third circuit element 907 in FIG. 11 can be replaced by a simple selector element where the region number parameter 913 chooses one of the bits of the input pixel value. The bit chosen is the one that corresponds to the power of two represented by the region number parameter 913. For example, if the region number parameter 913 is chosen to be 4, the third least significant bit is the bit to be examined.

Figure 12:
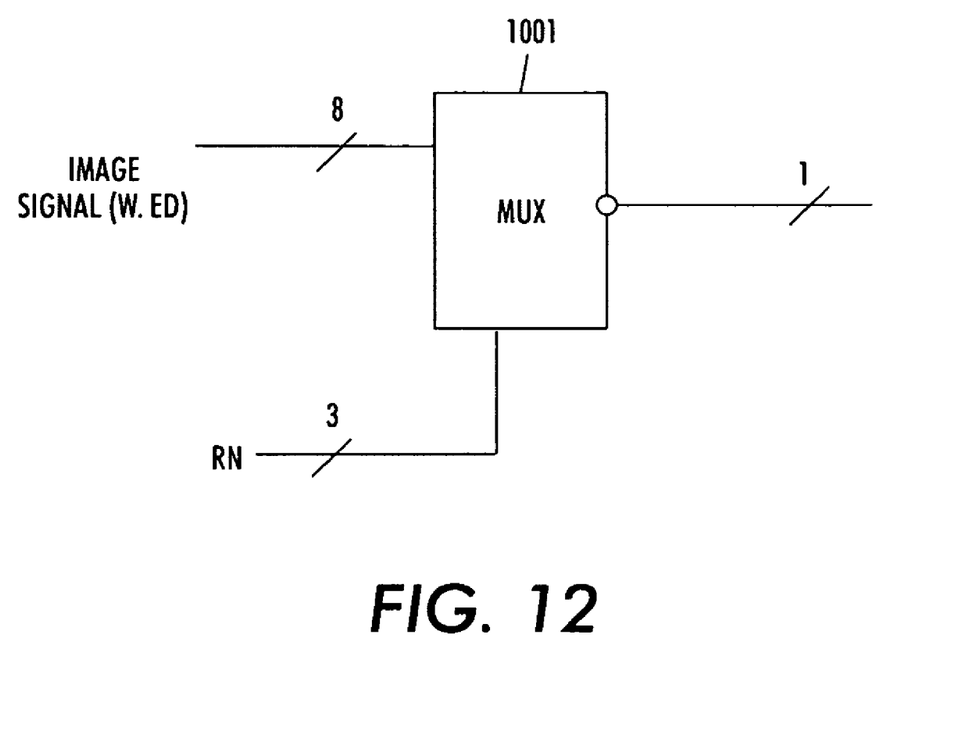
FIG. 12 illustrates a bit location selector circuit for an error diffusion process using a bit-flipping perturbation process.

FIG. 12 illustrates a circuit to provide the selection process discussed above. As illustrated in FIG. 12, the selection is realized by a multiplexer 1001 where the region number parameter 913 provides the selector input for the multiplexer 1001. The output of multiplexer 1001 is a single bit whose position is determined by the value of the RN input 913. Thus, the LUT implementation of element 907 in FIG. 11 can be replaced by a simple multiplexer if the region number is chosen to be a power of 2.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of halftoning an image using an error diffusion process, comprising:
    (a) generating an upper threshold level and a lower threshold level;
    (b) choosing a region number parameter;
    (c) selecting an unmodified input pixel value from the input image and modifying the unmodified input pixel value with a diffused error value;
    (d) comparing the modified input pixel value from the input image to the upper and lower threshold levels;
    (e) outputting a first pixel value when the modified input pixel value is below the lower threshold level;
    (f) outputting the first pixel value when the modified input pixel value is below the upper threshold level and above the lower threshold level and the modified input pixel value divided by the region number parameter, modulo 2, equals zero;
    (g) outputting a second pixel value, the first pixel value being different from the second pixel value, when the modified input pixel value is below the upper threshold level and above the lower threshold level and the modified input pixel value divided by the region number parameter, modulo 2, is not zero;
    (h) outputting the second pixel value when the modified input pixel value is above the upper threshold level;
    (i) determining a difference between the output pixel value and the modified input pixel value to generate an error; and
    (j) diffusing the error, as error values, to neighboring pixels.

2. The method as claimed in claim 1, wherein the region number parameter is an integral power of 2.

3. The method as claimed in claim 1, wherein the upper threshold level and the lower threshold level depend on the value of the unmodified input pixel value.

4. The method as claimed in claim 1, wherein the values of the upper threshold level and the lower threshold level depends upon an object type within the input image.

5. The method as claimed in claim 1, wherein the upper threshold level is generated by adding a first amount to a predetermined value within a pixel value range, the first amount being dependent upon the unmodified input pixel value;
    the lower threshold level being generated by adding a second amount to a predetermined value within a pixel value range, the second amount being dependent upon the unmodified input pixel value.

6. The method as claimed in claim 5, wherein the first amount is a first function of the unmodified input pixel value varying in a piecewise linear manner;
    the second amount being a second function of the unmodified input pixel value varying in a piecewise linear manner.

7. The method as claimed in claim 5, wherein a magnitude of the first amount depends upon an amount of texture in the input image and a magnitude of the second amount depends upon an amount of texture in the input image.

8. The method as claimed in claim 5, wherein a magnitude of the first amount depends upon an amount of noise in the input image and a magnitude of the second amount depends upon an amount of noise in the input image.

9. The method as claimed in claim 1, wherein the generation of the upper threshold level and the lower threshold level retrieves values from a look-up table based upon the unmodified input pixel value.

10. The method as claimed in claim 1, wherein the upper threshold level is generated using a first linearly decreasing function dependent upon the unmodified input pixel value;
    the lower threshold level being generated using a second linearly decreasing function dependent upon the unmodified input pixel value.

11. A method of halftoning an image using an error diffusion process, comprising:
    (a) choosing an upper threshold level and a lower threshold level;
    (b) selecting an unmodified input pixel value from the input image and modifying the unmodified input pixel value with a diffused error value;
    (c) comparing the modified input pixel value from the input image to the upper and lower threshold levels;
    (d) outputting a first pixel value when the modified input pixel value is below the lower threshold level;
    (e) outputting the first pixel value when the modified input pixel value is below the upper threshold level and above the lower threshold level and a predetermined bit of the modified input pixel value has a logic value of 1;
    (f) outputting a second pixel value, the first pixel value being different from the second pixel value, when the modified input pixel value is below the upper threshold level and above the lower threshold level and the predetermined bit of the modified input pixel value has a logic value of 0;
    (g) outputting the second pixel value if it is determined that the modified input pixel value is above the upper threshold level;
    (h) determining a difference between the output pixel value and the modified input pixel value to generate an error; and
    (i) diffusing the error, as error values, to neighboring pixels.

12. The method as claimed in claim 11, wherein the upper threshold level and the lower threshold level depend on the value of the unmodified input image.

13. The method as claimed in claim 11, wherein the values of the upper threshold level and the lower threshold level depends upon an object type within the input image.

14. The method as claimed in claim 11, wherein the upper threshold level is generated by adding a first amount to a predetermined value within a pixel value range, the first amount being dependent upon the unmodified input pixel value;
    the lower threshold level being generated by adding a second amount to a predetermined value within a pixel value range, the second amount being dependent upon the unmodified input pixel value.

15. The method as claimed in claim 14, wherein the first amount is a first function of the unmodified input pixel value varying in a piecewise linear manner;
    the second amount being a second function of the unmodified input pixel value varying in a piecewise linear manner.

16. The method as claimed in claim 14, wherein a magnitude of the first amount depends upon an amount of texture in the input image and a magnitude of the second amount depends upon an amount of texture in the input image.

17. The method as claimed in claim 14, wherein a magnitude of the first amount depends upon an amount of noise in the input image and a magnitude of the second amount depends upon an amount of noise in the input image.

18. The method as claimed in claim 11, wherein the generation of the upper threshold level and the lower threshold level retrieves values from a look-up table based upon the unmodified input pixel value.

19. The method as claimed in claim 11, wherein the upper threshold level is generated using a first linearly decreasing function dependent upon the unmodified input pixel value;

the lower threshold level being generated using a second linearly decreasing function dependent upon the unmodified input pixel value.

* * * * *